(12) United States Patent
Kagawa et al.

(10) Patent No.: US 8,037,107 B2
(45) Date of Patent: Oct. 11, 2011

(54) DOCUMENT TRANSFER ASSISTING SYSTEM, MONITOR APPARATUS, DOCUMENT TRANSFER ASSISTING APPARATUS, METHOD AND COMPUTER READABLE RECORDING MEDIUM

(75) Inventors: Tetsuhiro Kagawa, Saitama (JP); Emi Kimizuka, Kanagawa (JP); Hideo Matsumoto, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 387 days.

(21) Appl. No.: 12/273,911

(22) Filed: Nov. 19, 2008

(65) Prior Publication Data
US 2009/0132548 A1    May 21, 2009

(30) Foreign Application Priority Data
Nov. 20, 2007   (JP) ................................. 2007-300780

(51) Int. Cl.
*G06F 17/30* (2006.01)
*G06F 7/00* (2006.01)
(52) U.S. Cl. ....................................................... 707/803
(58) Field of Classification Search .................... 707/803
See application file for complete search history.

(56) References Cited

U.S. PATENT DOCUMENTS
2009/0125472 A1* 5/2009 Houchi ........................... 706/50

FOREIGN PATENT DOCUMENTS
JP   2001-357051   12/2001
JP   2006-309442   11/2006

* cited by examiner

*Primary Examiner* — Kuen Lu
(74) *Attorney, Agent, or Firm* — Oblon, Spivak, McClelland, Maier & Neustadt, L.L.P.

(57) ABSTRACT

A user inputs a document to be registered in a document management server to a document transfer assisting apparatus. The document transfer assisting apparatus automatically acquires attribute information of a document designated by the user, based on an instruction input by the user. The document transfer assisting apparatus further makes an addition or a change to the acquired attribute information according to the user's instruction. The document transfer assisting apparatus then outputs a copy of the designated document and attribute information thereof to a predetermined folder and a predetermined file, which can be referred to by the monitor apparatus. The monitor apparatus monitors the folder and file, and registers the copied file in the folder based on information output to the file.

9 Claims, 15 Drawing Sheets

FIG. 2

DOCUMENT ATTRIBUTE STORAGE UNIT 131

| DOCUMENT ID | FILE NAME | FILE SIZE | DATE OF CREATION | UPDATE DATE | LAST REFERRED DATE | TYPE |
|---|---|---|---|---|---|---|
| 1 | file1.ppt | 480KB | 2007/9/1 | 2007/9/1 | 2007/9/8 | Microsoft PowerPoint |
| 2 | file2.xls | 50KB | 2007/5/25 | 2007/5/27 | 2007/5/28 | Microsoft Excel |
| ... | ... | ... | ... | ... | ... | ... |

| FILE PATH | CLIENT NAME | CREATOR | DOCUMENT CLASS | DOCUMENT NAME | DOCUMENT CONTENT |
|---|---|---|---|---|---|
| \\aa\c\file1.ppt | zzz Company | Taro Yamada | specification | Specification for zzz Company | first draft for zzz company |
| \\aa\c\file2.xls | yyy Company | Hanako Yamada | quotation | Work Quotation | final quotation |
| ... | ... | ... | ... | ... | ... |

FIG. 3

LOG FILE

| FILE NAME | PATH BEFORE REGISTRATION | EXECUTION DATE | EXECUTION RESULT | POST-REGISTRATION PATH | REQUESTER ID INFORMATION |
|---|---|---|---|---|---|
| file1.ppt | ¥¥aa¥c¥file1.ppt | 2007/10/31 | SUCCESS | ¥¥server¥specification¥file1.doc | terminal a |
| file2.xls | ¥¥aa¥c¥file2.xls | 2007/10/31 | SUCCESS | ¥¥server¥quotation¥file2.doc | terminal b |
| ... | ... | ... | ... | ... | ... |

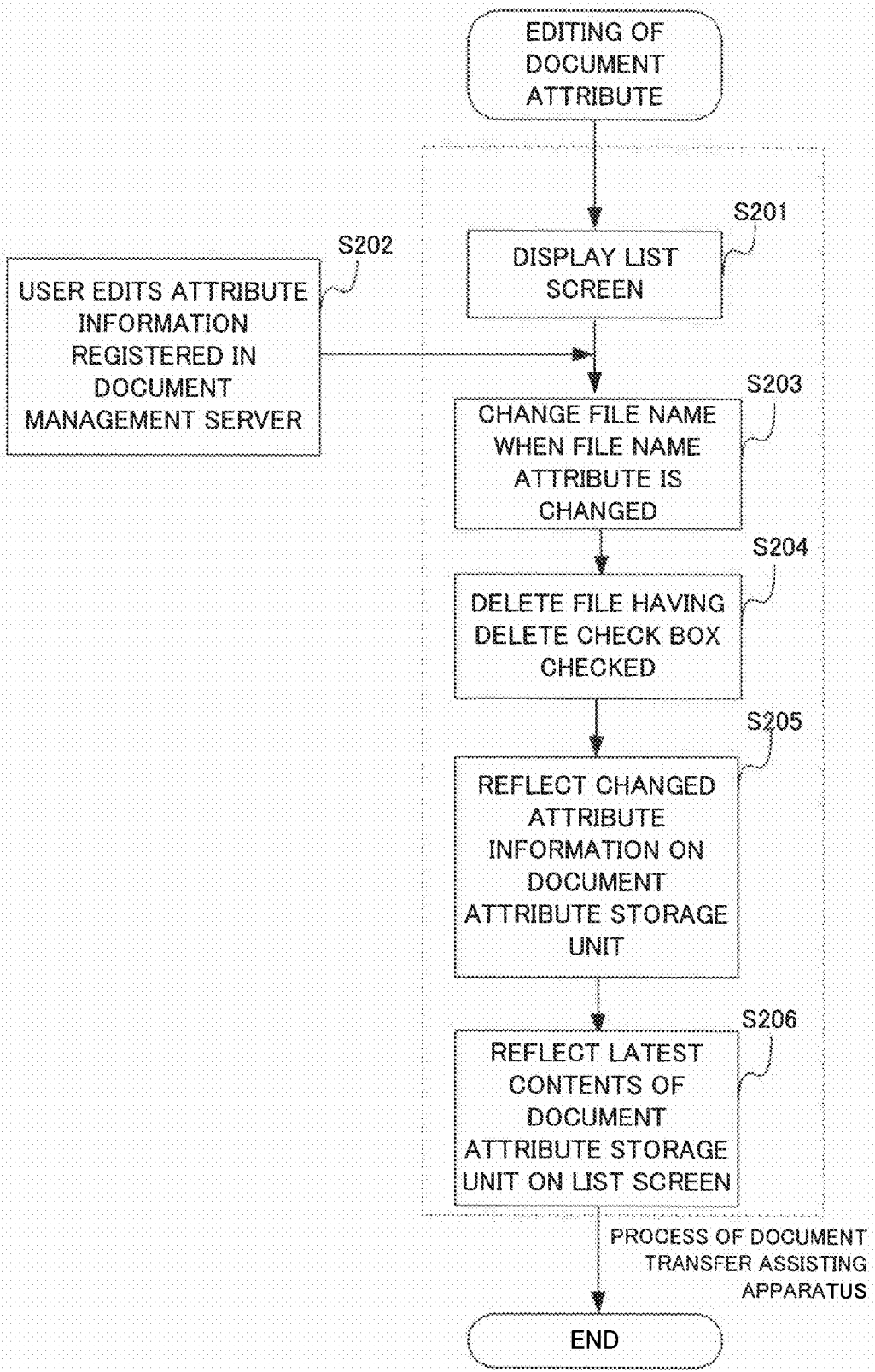

FIG. 8A

LIST SCREEN

| ID<br>Delmark | File Name | Client Name<br>Creator | Document Class<br>Document Name | Document<br>Content | File Path |
|---|---|---|---|---|---|
| 0001<br>☐ | file1.ppt | zzz Company<br>Taro Yamada | specification<br>Specification for zzz Company | first draft for zzz company | ¥¥aa¥c¥file1.ppt |
| 0002<br>☐ | file2.xls | yyy Company<br>Hanako Yamada | quotation<br>Work Quotation | final quotation | ¥¥aa¥c¥file2.xls |
| 0003<br>☐ | ... | ... | ... | ... | ... |

[REFLECT CHANGE]

FIG. 8B

DOCUMENT ATTRIBUTE INPUT SCREEN

| field | value |
|---|---|
| file name | xxTransferSpecification1-0.ppt |
| new file name | |
| type | Microsoft PowerPoint Presentation |
| file size | 480,171 |
| update date | 2007/09/01 15:28:00 |
| date of creation | 2007/09/01 15:15:00 |
| last referred date | 2000/09/08 09:05:00 |
| file path | *¥*¥file1.ppt |

| field | value |
|---|---|
| client name | zzz Company |
| document class | specification |
| document name | Specification for zzz Company |
| document content | first draft for zzz Company |
| creator | Taro Yamada |

[REFLECT CHANGE]

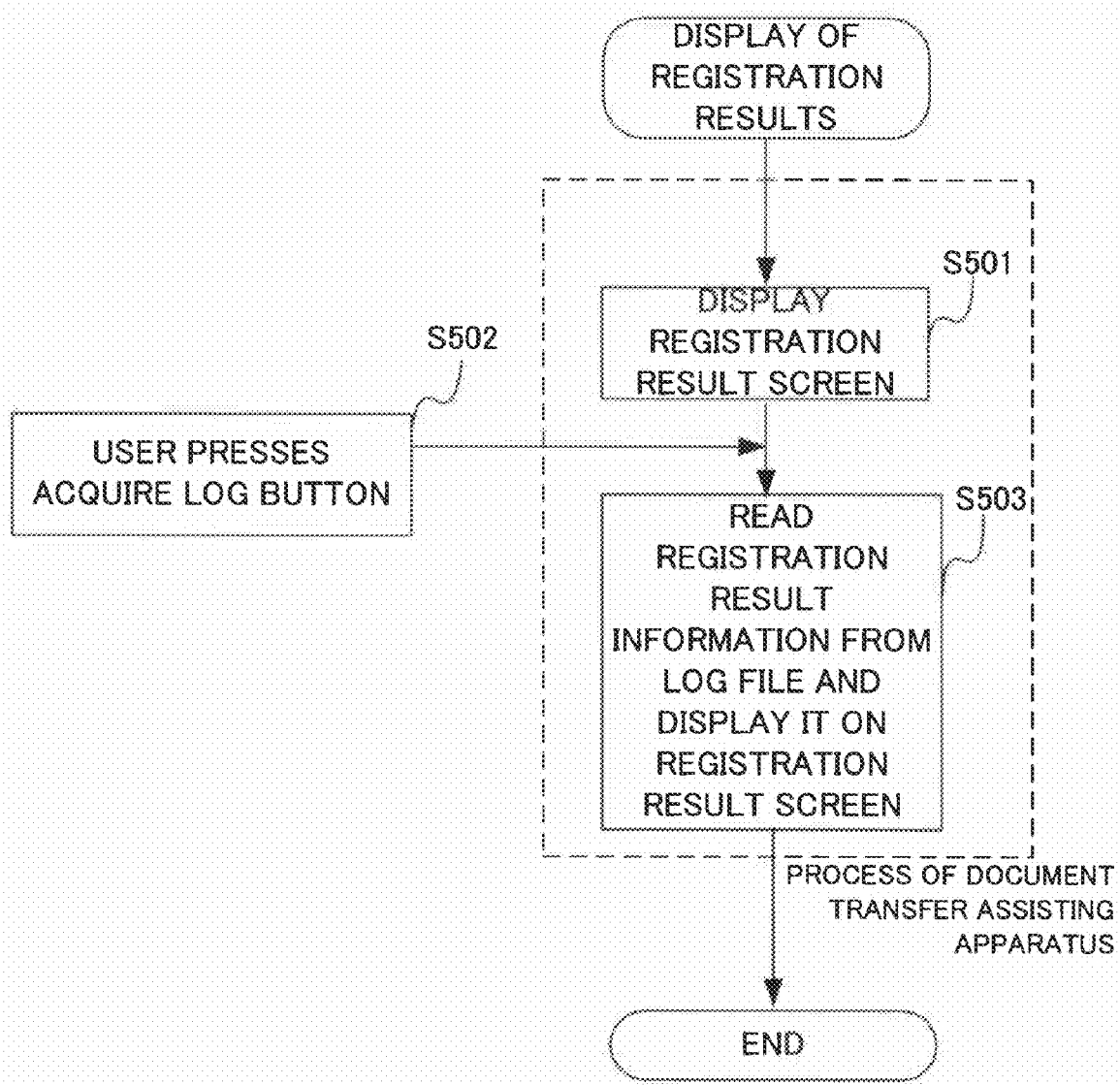

FIG. 13

REGISTRATION RESULT SCREEN

[ACQUIRE LOG]

| FILE NAME | PATH BEFORE REGISTRATION | EXECUTION DATE | EXECUTION RESULT | POST-REGISTRATION PATH |
|---|---|---|---|---|
| file1.doc | ¥¥aa¥c¥file1.doc | 2007/10/31 | SUCCESS | ¥¥server¥specification¥file1.doc |
| file2.doc | ¥¥aa¥c¥file2.doc | 2007/10/31 | SUCCESS | ¥¥server¥quotation¥file2.doc |

DOCUMENT TRANSFER ASSISTING SYSTEM, MONITOR APPARATUS, DOCUMENT TRANSFER ASSISTING APPARATUS, METHOD AND COMPUTER READABLE RECORDING MEDIUM

BACKGROUND OF THE INVENTION

1. Field of the Invention

The present invention relates to a document transfer assisting system, monitor apparatus, document transfer assisting apparatus, method and computer readable recording medium, which efficiently gives metadata to an electronic file stored in a PC (personal computer) or a file server to assist transfer of the electronic file to a document management server.

2. Description of the Related Art

Recently, the International Standard for adequately carrying out management of records (ISO15489) has been established. "Records" are documents that are provided with metadata describing a context by which a document is created (e.g., background, state, environment), contents of the document, and a structure or the like of the document. According to this definition, while all records are documents, not all documents are necessarily records. There are growing needs among companies to efficiently and systematically manage the creation, reception, maintenance, use and processing of records having metadata given thereto in conformity to the International Standard.

Meanwhile, there has been a document management server which creates and maintains documents. For example, Unexamined Japanese Patent Application KOKAI Publication No. 2001-357051 discloses a technique of giving a digital signature to a document to manage the document. Unexamined Japanese Patent Application KOKAI Publication No. 2006-309442 discloses a technique of giving a time stamp to a document to manage the document.

However, such document management servers do not have a function of collectively and efficiently registering (or transferring) existing document resources stored in a file server, a PC or the like. In addition, there has not been much consideration given to transfer of documents from such a document management server to another document management server having metadata of another format.

In consideration of the foregoing situation, it is an object of the present invention to provide a document transfer assisting system, monitor apparatus, document transfer assisting apparatus, method and computer recording medium, which efficiently provide metadata to a document to be stored in a PC or a file server to assist transfer of the document to a document management server.

SUMMARY OF THE INVENTION

To achieve the object, according to a first aspect of the invention, there is provided a document transfer assisting system having a document transfer assisting apparatus connected over a network to a monitor apparatus that monitors a predetermined file to which the document transfer assisting apparatus outputs information, and requests a predetermined document management server to register a document based on the information output to the predetermined file, the monitor apparatus comprising:

a registration information storage unit that stores a predetermined file having attribute information outputted by the document transfer assisting system including information on a document to be registered in the document management server in response to an instruction input to the document transfer assisting apparatus by a user, the information specifying at least the document; and a registration information monitoring unit that monitors the predetermined file stored in the registration information storage unit, and, when determining that attribute information is output to the predetermined file, acquires a document based on document specifying information included in each of the attribute information outputted, and transmits the document, the attribute information thereof, and a document registration request to the document management server, the document transfer assisting apparatus comprising:

a document attribute acquiring unit that, for each document to be registered in the document management server designated by the user, acquires attribute information including information specifying at least the document;

a document attribute storage unit that stores the acquired attribute information;

an update unit that updates the attribute information stored in the document attribute storage unit in response to an instruction input by the user; and a registration unit that outputs each piece of the attribute information stored in the document attribute storage unit to the predetermined file stored in the registration information storage unit of the monitor apparatus at a predetermined timing.

In the document transfer assisting apparatus, the registration unit may name, according to a predetermined rule, a copy file of a document to be registered in the document management server specified by the information stored in the document attribute information storage unit, outputs the copy file and the name of the copy file in the registration information storage unit, said name of the copy file being the information specifying at least the document stored in the predetermined file of the registration information storage unit, and in the monitor apparatus, when determining that attribute information is output to the predetermined file, the registration information monitoring unit may acquire a copy file having a file name included in each of the attribute information outputted, and transmit the copy file, the attribute information thereof, and a document registration request to the document management server.

In the document transfer assisting apparatus, the registration unit may output to the predetermined file of the registration information storage unit, a file path indicating a location of the document to be registered in the document management server specified by the information stored in the document attribute information storage unit, said file path being the information specifying at least the document stored in the predetermined file of the registration information storage unit, and in the monitor apparatus, when determining that attribute information is output to the predetermined file, the registration information monitoring unit may acquire a document specified by the file path included in each of the attribute information outputted, and transmit the document, the attribute information thereof, and a document registration request to the document management server.

The monitor apparatus may further comprise:

a reception unit that receives from the document management server, registration result information for each of requests, transmitted by the registration unit; and a registration result storage unit that stores the received registration result information, and the document transfer assisting apparatus further comprises a registration result acquiring unit that acquires the registration result information stored in the registration result storage unit.

In the document transfer assisting apparatus, the registration unit may output each piece of the attribute information stored in the document attribute storage unit to the predetermined file stored in the registration information storage unit at least at either one of the following timings of: when an instruction from the user has been input, at a predetermined time, and at a predetermined time interval.

According to a second aspect of the invention, there is provided a monitor apparatus connected over a network to a document transfer assisting apparatus to monitor a predetermined file to which the document transfer assisting apparatus outputs information, and request a predetermined document management server to register a document based on the information output to the predetermined file, the monitor apparatus comprising:

a registration information storage unit that stores a predetermined file having attribute information outputted by the document transfer assisting system including information on a document to be registered in the document management server in response to an instruction input to the document transfer assisting apparatus by a user, the information specifying at least the document; and a registration information monitoring unit that monitors the predetermined file stored in the registration information storage unit, and, when determining that attribute information is output to the predetermined file, acquires a document based on document specifying information included in each of the attribute information outputted, and transmits the document, the attribute information thereof, and a document registration request to the document management server.

According to a third aspect of the invention, there is provided a document transfer assisting apparatus connected over a network to a monitor apparatus that monitors a predetermined file and requests a predetermined document management server to register a document based on information output to the predetermined file, the document transfer assisting apparatus comprising:

a document attribute acquiring unit that, for each document to be registered in the document management server designated by the user, acquires attribute information including information specifying at least the document;

a document attribute storage unit that stores the acquired attribute information;

an update unit that updates the attribute information stored in the document attribute storage unit in response to an instruction input by the user; and a registration unit that outputs each piece of the attribute information stored in the document attribute storage unit to the predetermined file stored in the registration information storage unit of the monitor apparatus at a predetermined timing.

According to a fourth aspect of the invention, there is provided an operation method for a document transfer assisting system having a document transfer assisting apparatus connected over a network to a monitor apparatus that monitors a predetermined file to which the document transfer assisting apparatus outputs information, and requests a predetermined document management server to register a document based on the information output to the predetermined file, the monitor apparatus including a registration information storage unit and a registration information monitoring unit, the document transfer assisting apparatus including a document attribute acquiring unit, a document attribute storage unit, an update unit and a registration unit, the operation method including the steps of:

in the monitor apparatus, allowing the registration information storage unit to store a predetermined file having attribute information outputted by the document transfer assisting system including information on a document to be registered in the document management server in response to an instruction input to the document transfer assisting apparatus by a user, the information specifying at least the document; and allowing the registration information monitoring unit to monitor the predetermined file to be stored in the registration information storage unit, and, when determining that attribute information is output to the predetermined file, to acquire a document based on document specifying information included in each of the attribute information outputted, and to transmit the document, the attribute information thereof, and a document registration request to the document management server, in the document transfer assisting apparatus, allowing the document attribute acquiring unit to, for each document to be registered in the document management server designated by the user, acquire attribute information including information specifying at least the document;

allowing the document attribute storage unit to store the acquired attribute information;

allowing the update unit to update the attribute information stored in the document attribute storage unit in response to an instruction input by the user; and allowing the registration unit to output each piece of the attribute information stored in the document attribute storage unit to the predetermined file stored in the registration information storage unit at a predetermined timing.

According to a fifth aspect of the invention, there is provided a computer readable recording medium storing a program for allowing a document transfer assisting apparatus computer to function as a document transfer assisting apparatus, and a program for allowing a monitor apparatus computer, connected over a network to the document transfer assisting apparatus computer, to function as a monitor apparatus that monitors a predetermined file to which the document transfer assisting apparatus outputs information, and requests a predetermined document management server to register a document based on the information output to the predetermined file, the program for the monitor apparatus allowing the monitor apparatus computer to function as:

a registration information storage unit that stores a predetermined file having attribute information outputted by the document transfer assisting system including information on a document to be registered in the document management server in response to an instruction input to the document transfer assisting apparatus by a user, the information specifying at least the document; and a registration information monitoring unit that monitors the predetermined file stored in the registration information storage unit, and, when determining that attribute information is output to the predetermined file, acquires a document based on document specifying information included in each of the attribute information outputted, and transmits the document, the attribute information thereof, and a document registration request to the document management server, the program for the document transfer assisting apparatus allowing the document transfer assisting apparatus computer to function as:

a document attribute acquiring unit that, for each document to be registered in the document management server designated by the user, acquires attribute information including information specifying at least the document;

a document attribute storage unit that stores the acquired attribute information;

an update unit that updates the attribute information stored in the document attribute storage unit in response to an instruction input by the user; and a registration unit that outputs each piece of the attribute information stored in the document attribute storage unit to the predetermined file stored in the registration information storage unit of the monitor apparatus at a predetermined timing.

BRIEF DESCRIPTION OF THE DRAWINGS

These objects and other objects and advantages of the present invention will become more apparent upon reading of the following description and the accompanying drawings in which:

FIG. 2 is a diagram showing an example of a data structure of a document attribute storage unit;

FIG. 3 is a diagram showing a structural example of a log file;

FIG. 7 is a flowchart for explaining an "editing of document attribute" process;

FIG. 8A is a diagram showing an example of a list screen;

FIG. 8B is a diagram showing an example of a document attribute input screen;

FIG. 12 is a flowchart for explaining a "display of registration results" process;

FIG. 13 is a diagram showing a display example of a registration result screen.

DETAILED DESCRIPTION OF THE PREFERRED EMBODIMENT

A document transfer assisting apparatus and a monitor apparatus according to preferred embodiment of the present invention will now be described by way of example in a document transfer assisting apparatus with reference to the accompanying drawings.

Figure 1:
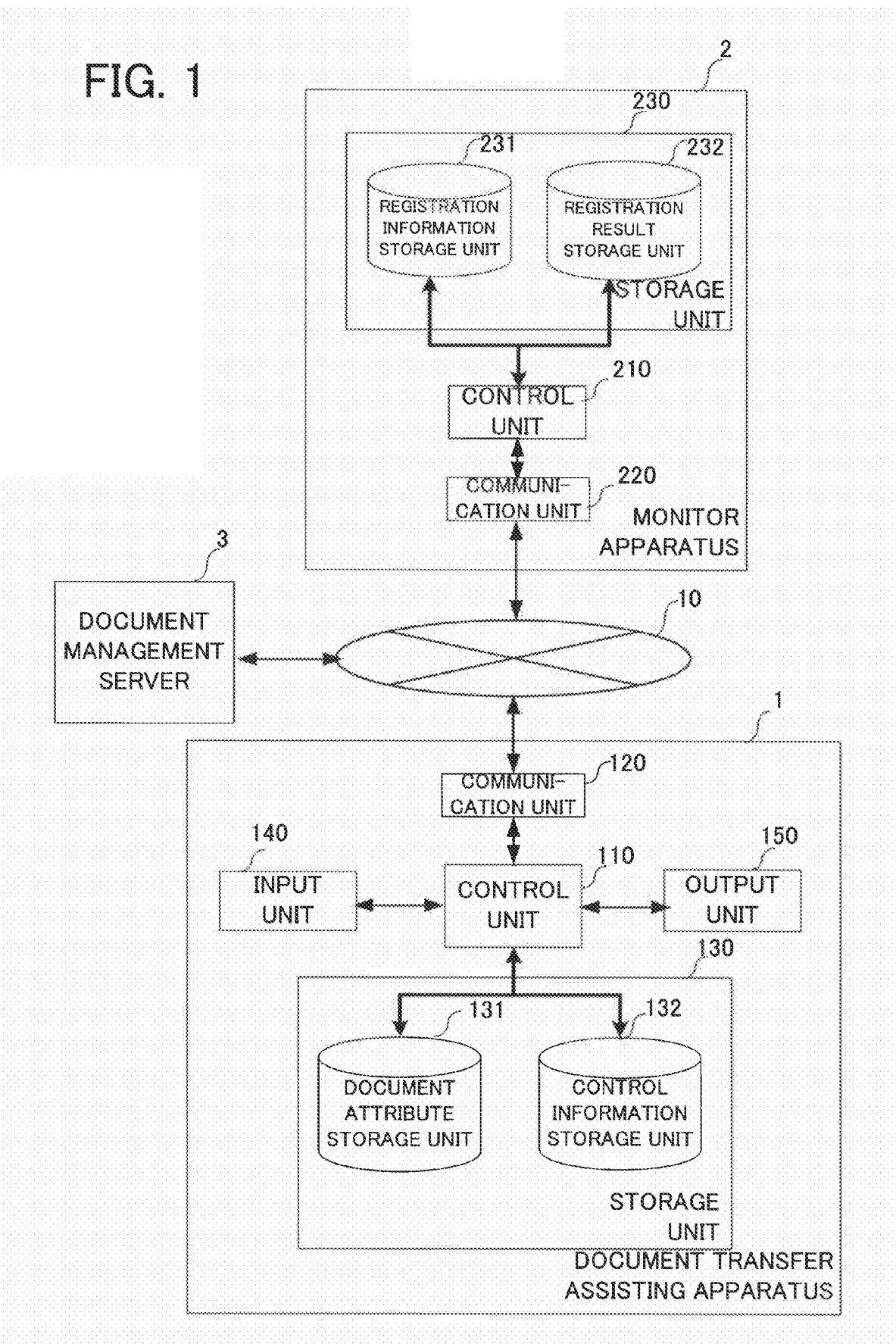
FIG. 1 is a block diagram showing a configurational example of a system according to one embodiment of the present invention.

FIG. 1 is a diagram showing the configuration of a document transfer assisting system according to one embodiment of the present invention. As illustrated, the document transfer assisting system has a document transfer assisting apparatus 1, a monitor apparatus 2, and a document management server 3 connected together over a network 10.

According to the embodiment, the document transfer assisting apparatus 1 acquires an electronic document (hereafter called "document" which is a file including at least either one of text, image, moving picture, etc.) and attribute information thereof from a file server (not shown) or a terminal device (not shown) connected to the network 10, based on an instruction input by a user. Next, in response to the instruction input by the user, the document transfer assisting apparatus 1 adds a content to or changes the contents of the attribute information, and registers the document together with the attribute information to a folder which is monitored by the monitor apparatus 2. When determining that the document and the attribute information are registered in the folder monitored by the monitor apparatus 2, the monitor apparatus 2 registers the document and attribute information to the document management server 3 over the network 10.

The configurations of the document transfer assisting apparatus 1, the monitor apparatus 2 and the document management server 3 will be described below.

To begin with, as shown in FIG. 1, the document transfer assisting apparatus 1 has a control unit 110, a communication unit 120 and a storage unit 130. Typically, a user terminal device or the like having a document transfer assisting program or so installed therein serves as the document transfer assisting apparatus 1. The document transfer assisting system may be connected with more than one document transfer assisting apparatus 1.

The control unit 110 includes a CPU (Central Processing Unit) (not shown), ROM (Read Only Memory) (not shown), and RAM (Random Access Memory) (not shown), and performs the general control of the document transfer assisting apparatus 1. Specifically, as the CPU executes a program stored in the storage unit 130 to be described later, the CPU performs various kinds of control and various operations. For example, the CPU acquires the attribute of a document present in the file server or the like connected to the network 10, and generates metadata needed for the monitor apparatus 2 to transfer (register) a designated document to the document management server 3. At the time of performing control and operations, the CPU uses the RAM as a work area for temporary storage or the like of various kinds of data.

The communication unit 120 has a communication interface or the like, and communicates with other file servers over the communication network 10 to acquire designated file information in cooperation with the control unit 110, for example. The communication unit 120 may execute communication based on a protocol, such as TCP/IP. The communication unit 120 may include a modem unit or an infrared communication unit or the like.

The storage unit 130 comprises a large-capacity hard disk device or the like and stores a control program including an operating system to control the document transfer assisting apparatus 1, and various application programs for assisting document transfer. The storage unit 130 also functions as a document attribute storage unit 131, a control information storage unit 132, and so forth.

First, the document attribute storage unit 131 will be described referring to FIG. 2. The document attribute storage unit 131 is a database to store attribute information, such as a document ID, file name, file size, date of creation, update date, last referred date, type, file path, client name, creator, document class, document name, and document content, for each of documents to be registered in the document management server 3. The "document ID" is identification information which is automatically given to the document so that control unit 110 is able to identify a document. The "file name" is a name given to a document. The "file size" is the data size of a document. The "date of creation" is a date on which a document is created. The "update date" is a date on which a document is last updated. The "last referred date" is a date on which a document is last referred to.

The "type" is information indicating whether the file is a text file or a file which is opened from a specific application.

In case of a Microsoft PowerPoint (registered trademark) presentation file, for example, the "type" attribute indicates that the file is a presentation file of Microsoft PowerPoint (registered trademark). The "file path" is information indicating the location of the file, and includes a file name. The "client name" is the name of a client relating to the file (e.g., delivery destination for the file).

The "creator" is the name of a user who has created the file. The "document class" is a class according to the storage design of the document management server 3 where the file is registered. When the folder structure of the document management server 3 is based on the stages of a project, for example, documents may be classified into quotations, requirements, specifications, etc. A folder is registered in a corresponding folder in the document management server 3 according to the designated document class. The "document name" is the subject or title of a document. The "document content" is a brief comment describing a document.

The control information storage unit 132 stores configuration information designating a file or an application software that the document transfer assisting apparatus 1 refers to.

The input unit 140 is used to input various kinds of information, and has an input device, such as a keyboard and/or a mouse.

The output unit 150 outputs various kinds of information, and has a display device, such as a display.

Next, the monitor apparatus 2 will be described. The monitor apparatus 2 monitors a predetermined folder. When the document transfer assisting apparatus 1 adds new information to a predetermined file in the predetermined folder, the monitor apparatus 2 sends to the document management server 3, a registration request for a document based on the added information. The monitor apparatus 2 includes a control unit 210, a communication unit 220 and a storage unit 230. For easier understanding of the embodiment, the following description is given on the premise that there is one monitor apparatus 2 for one document management server 3.

The control unit 210 includes a CPU (not shown), ROM (not shown), and RAM (not shown), and performs the general control of the monitor apparatus 2. Specifically, as the CPU executes a program stored in the storage unit 230 to be described later, the CPU performs various kinds of control and various operations to transfer (register) a document to the document management server 3. At the time of performing control and operations, the CPU uses the RAM as a work area for temporary storage or the like of various kinds of data.

The communication unit 220 has a communication interface or the like, and communicates with the document management server 3 and so forth over the communication network 10 in cooperation with the control unit 210, for example. The communication unit 220 may execute communication based on a protocol, such as TCP/IP. The communication unit 220 may include a modem unit or an infrared communication unit or the like.

The storage unit 230 comprises a large-capacity hard disk device or the like and stores a control program including an operating system to control the monitor apparatus 2, and a monitoring application program. The storage unit 230 also functions as a registration information storage unit 231, a registration result storage unit 232, and so forth.

The registration information storage unit 231 stores a copy of a document to be registered in the document management server 3, and a registration information file of the CSV (comma separated value) format having attribute information of the document stored therein. In response to an instruction given by a user, the control unit 110 of the document transfer assisting apparatus 1 converts attribute information of a document to be registered, which is stored in the local document attribute storage unit 131, to CSV format, and adds the converted attribute information to the registration information file stored in registration information storage unit 231. The copy of the entity of the document to be registered is also registered in the registration information storage unit 231. When the monitor apparatus 2 determines that new information has been added to the registration information file stored in the registration information storage unit 231, the monitor apparatus 2 sends a request to register the document to the document management server 3 based on the information stored in the registration information file.

The registration result storage unit 232 stores log information regarding the result of a document registration request sent to the document management server 3 from the monitor apparatus 2. A log file is a CSV type registration result information file having identification (ID) information of each document to be processed, path before registration (file path before being registered), execution date (date on which registration is executed), execution result (success or failure), post-registration path (including the position of a file after registration and a file name), registration requester (ID information of the document transfer assisting apparatus 1 which has requested registration of a file), etc. as one record. While the log file is illustrated to have a layout structure of FIG. 3 for ease of understanding, the log file is configured as a CSV type having individual items separated by a delimiter and individual records separated by a line feed.

Although the registration information storage unit 231 and the registration result storage unit 232 are realized on the storage unit 230 of the monitor apparatus 2 in the embodiment, they can be realized at any locations to which both the document transfer assisting apparatus 1 and the monitor apparatus 2 can refer. When there is a file server to which both the document transfer assisting apparatus 1 and the monitor apparatus 2 can refer, for example, the registration information storage unit 231 and the registration result storage unit 232 may be realized on the file server.

The document management server 3 comprises a computer or the like which has a communication unit having a communication function and a large-capacity storage unit. The document management server 3, for example, stores, in association with each other, a file to be managed and attribute information thereof in the large-capacity storage unit of the document management server 3. The items of attribute information which is managed by the document management server 3 may conform to the internal and domestic standards. The document management server 3 manages a file in the large-capacity storage unit by executing file access control on the file according to an access right, management of the history of file manipulation, etc., in conformity with the internal and domestic standards or the like.

When receiving from the monitor apparatus 2, a document, attribute information, a registering folder and a registration request, the document management server 3 registers the document in the designated registering folder in the large-capacity storage unit and stores the attribute information in association with the document in response to the registration request.

The document management server 3 stores the received attribute information by mapping the received attribute information on to the attribute fields that it locally manages based on the arrangement order of the received attribute information. At this time, the document management server 3 performs the process on the premise that the individual items of the received attribute information are arranged in a predetermined order. That is, the document management server 3 performs the process on the premise that the individual items of the received attribute information are arranged in a predetermined order of, for example, file name, path name, file size, and so forth. When the document management server 3 receives attribute information arranged in the order of A, B, C and so forth, for example, the document management server 3 stores the received information in association with the items of the attribute information in such a way that the file name is A, the path name is B, the file size is C, and so forth.

Therefore, the monitor apparatus 2 transmits the attribute information arranged in the order of items constituting each record (row) of the registration information file, together with the registration request, to the document management server 3. According to the structure of attribute information that the document management server 3 receives, the document transfer assisting apparatus 1 outputs the attribute information to a registration information file.

While attribute item field names are not exchanged between the monitor apparatus 2 and the document management server 3 according to the embodiment, the monitor apparatus 2 may transmit attribute item field names and attribute item information, associated with each other, to the document management server 3.

The operation of the document transfer assisting system will be described below.

Figure 4:
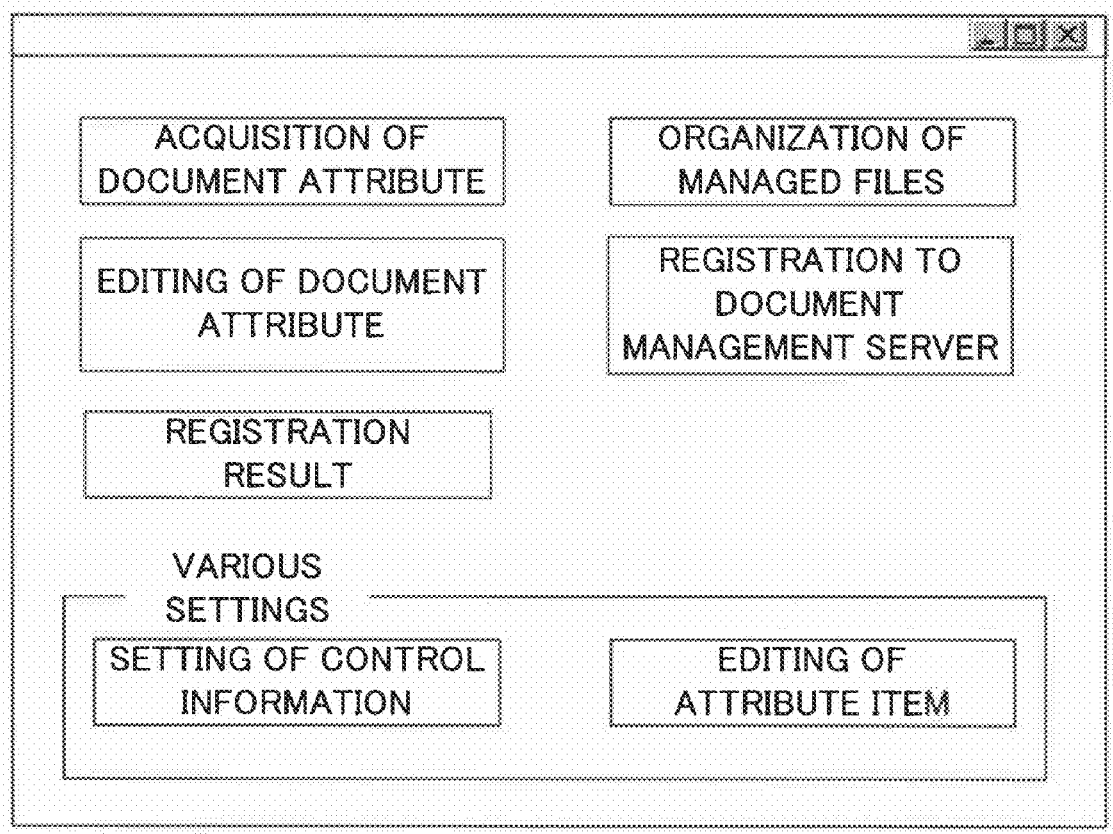
FIG. 4 is a diagram showing a display example of a menu screen.

When a user activates a document transfer assisting application provided by the document transfer assisting apparatus 1, the control unit 110 of the document transfer assisting apparatus 1 displays a menu screen shown in FIG. 4. According to the displayed menu screen, the user operates the input unit 140 to select a service provided by the document transfer assisting apparatus 1. Major services provided by the document transfer assisting apparatus 1 include acquisition of document attribute, editing of document attribute, organization of managed files, registration (transfer) to document management server, display of registration results and various settings. The individual processes will be described below.

(Acquisition of Document Attribute)

Figure 5:
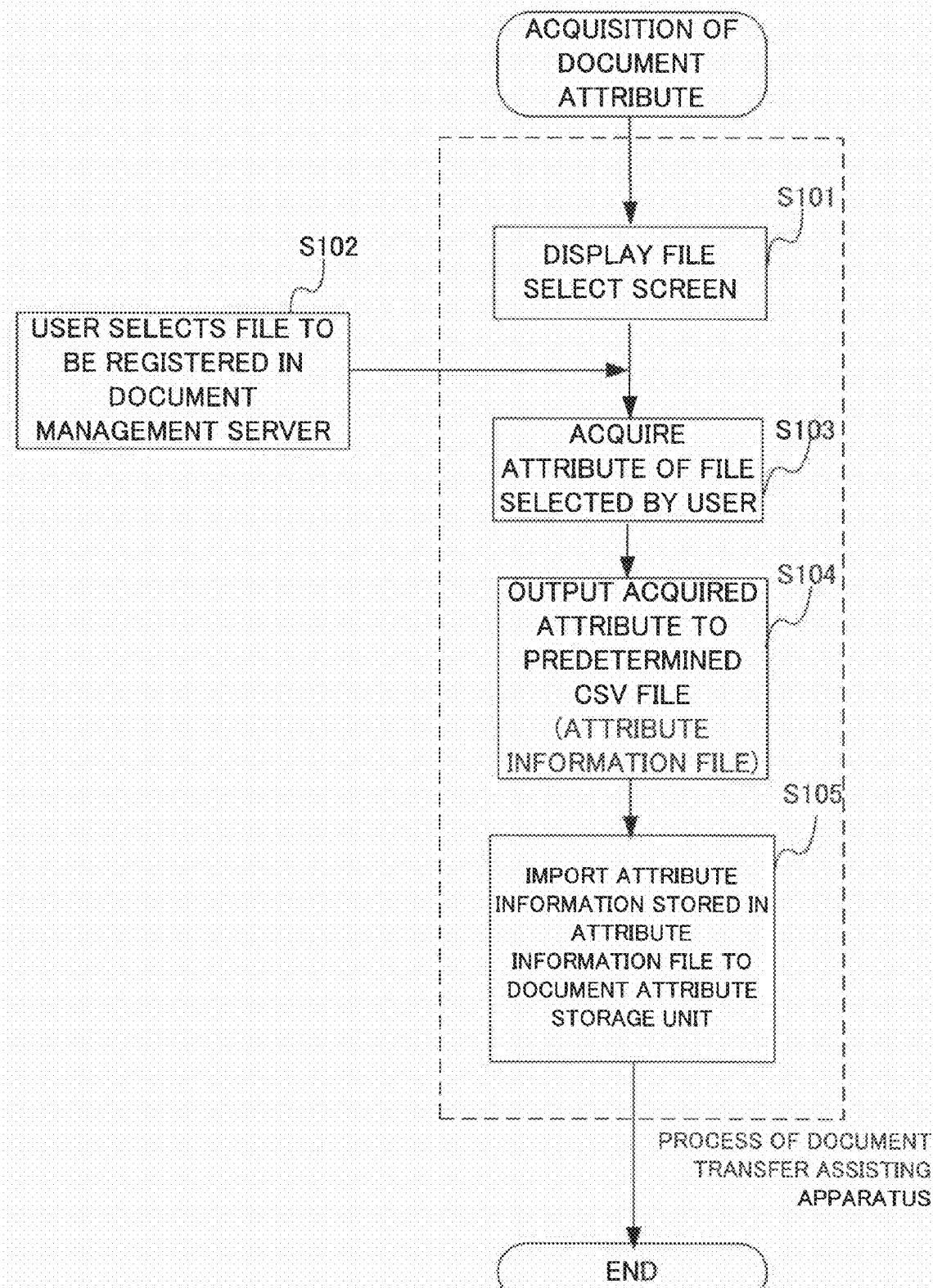
FIG. 5 is a flowchart for explaining an "acquisition of document attribute" process.
Figure 6:
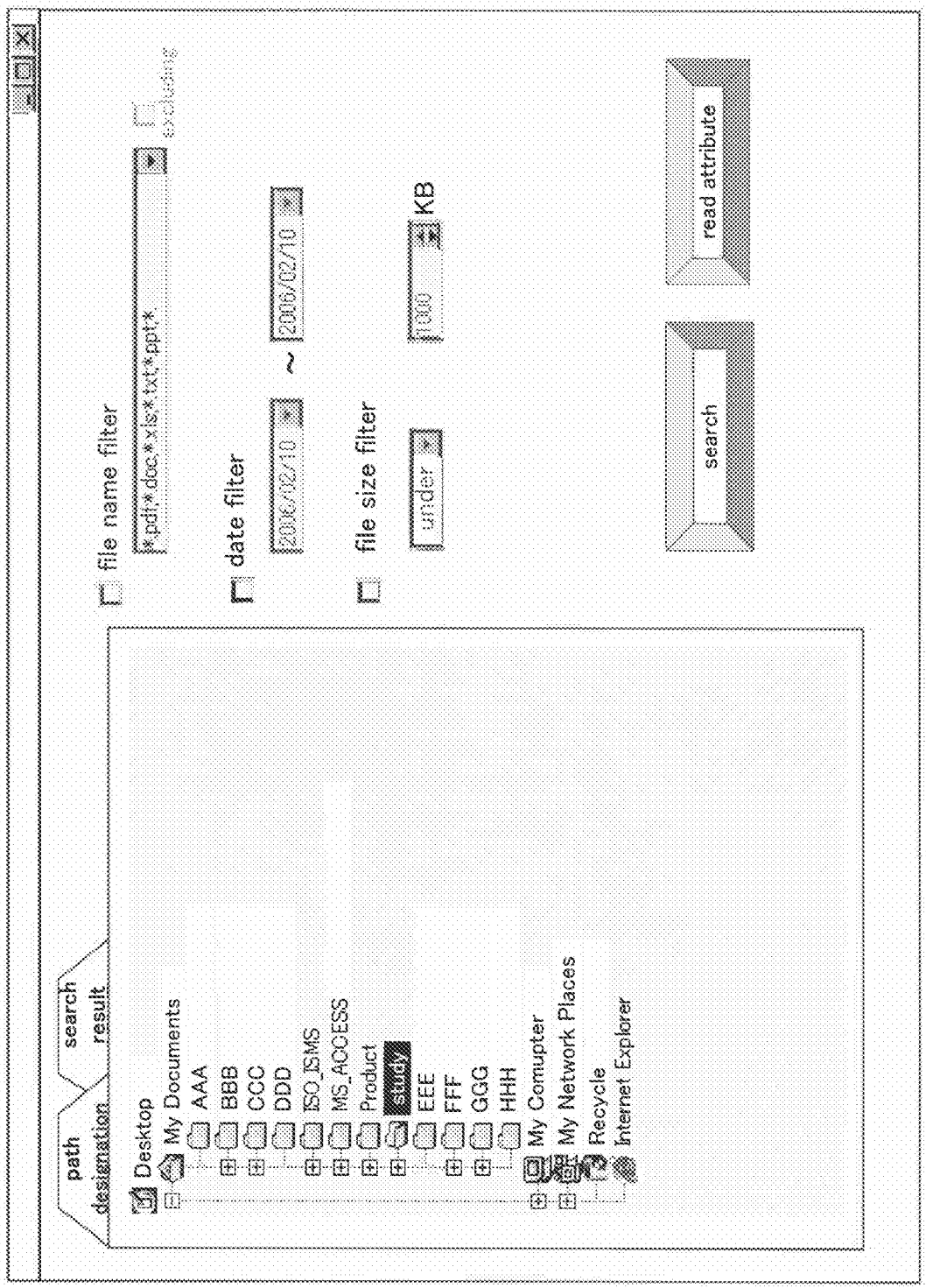
FIG. 6 is a diagram showing a display example of a file select screen.

A process flow for "acquisition of document attribute" is illustrated in FIG. 5. When a user selects "acquisition of document attribute" by manipulating the menu screen, the control unit 110 displays a file select screen as shown in FIG. 6 (step S101). The user designates a folder (or file) where a document to be registered in the document management server 3 is stored is designated through a "path designation" pane (step S102).

When the user selects a folder through the "path designation" pane, information under the folder is expanded and displayed. When the user selects the folder again, the state of the folder toggles and information under the folder is hid. The user manipulates the "path designation" pane to expand a folder in this manner to search for a desired folder (or file). When desired folder (or file) is found, the user selects the folder (or file) (plural folders or files are selectable), then presses a "Read Attribute" button. As a result, the folder (or file) that the user desires to register in the document management server 3 is designated.

Next, the control unit 110 of the document transfer assisting apparatus 1 acquires attribute information, such as a file name, file size, update date, date of creation, last referred date, file type, file path, creator, client name, document class, and document name, for each of documents under the selected folder (or a selected file if the file is selected) (step S103).

Of the attribute information, the file name, file size, update date, date of creation, last referred date, file type, and file path are automatically acquired when the control unit 110 inquires the operating system about them. The way in which the creator attribute is managed, however, differs according to the file format. Therefore, when the control unit 110 specifies the file format from the file extension or the like, and determines that the creator attribute is indeed an attribute managed by the file format, the control unit 110 reads the creator attribute according to the file format. With regard to the client name, document class, document name and so forth, the control unit 110 performs lexical analysis using an existing method to acquire candidate information from the contents of the document.

The control unit 110 outputs attribute information of each document acquired in the above manner, as one record, to an attribute information file of a predetermined CSV format (step S104). When acquisition of attribute information is complete for every attribute designated, the control unit 110 then imports attribute information to be stored in the attribute information file to the document attribute storage unit 131 (step S105). That is, each row (record) of the attribute information file is read, a document ID automatically generated (typically, a serial number is generated so that files handled in the past by the document transfer assisting apparatus 1 do not use same document IDs), and attribute information of each document in each record read are registered in association with each other as one record in the document attribute storage unit 131. The control unit 110 deletes any record of the attribute information file that has been registered in the document attribute storage unit 131.

The document transfer assisting apparatus 1 is configured in such a way that the function of acquiring a document attribute may be executed by another application software designated by the user. Therefore, the document transfer assisting apparatus 1 is configured to follow the procedures of temporarily storing acquired attribute information in a CSV file, then reading the document attribute from the CSV file and registering the document attribute in the document attribute storage unit 131. Application software capable of acquiring a document attribute can save the acquired attribute information in a CSV file format, which has high versatility, in most cases. If the document transfer assisting apparatus 1 can register a document attribute in the document attribute storage unit 131 based on a predetermined CSV file, therefore, it is possible to designate application software preferred by the user to acquire attribute information.

The acquisition of attribute information can also be executed by selecting a folder, then setting a filter to be displayed at the right portion of the file select screen shown in FIG. 6. When a filter is set, the control unit 110 displays a file in the selected folder which meets a filter condition, for example, in a search result pane. The user can acquire a document attribute by selecting files from search result pane, and pressing the Read Attribute button. In the example in FIG. 6, at least one of file extension, date and file size can be designated as a filter item as shown at the right part on the file select screen; however, other filter items may be introduced as well.

(Editing of Document Attribute)

A process for "editing of document attribute" will be described referring to FIG. 7. When the user manipulates the document transfer assisting apparatus 1 to select "editing of document attribute" shown in the menu screen of FIG. 4, the control unit 110 of the document transfer assisting apparatus 1 acquires files and attribute information thereof from the document attribute storage unit 131, and displays a list screen as shown in FIG. 8A, showing a list of the files and attribute information, on the output unit 150 (step S201).

With regard to the client name, creator and document class in the listed information, each information acquired in the "acquisition of document attribute" process is displayed in a corresponding list box as a candidate. When the expansion of each list box is designated by the user (i.e., an arrow affixed to the list box is selected), the expanded list box displays the following information. For example, a client name list box displays a client name of a client, which is acquired as a consequence of an inquiry made to a server (not shown) which manages client information by the control unit 110 over the network 10 in a selectable manner. Likewise, an expanded creator list box displays an employee name, which is acquired as a consequence of an inquiry made to a server (not shown) which stores personal information, such as the names of all employees, by the control unit 110 over the network 10 in a selectable manner. An expanded document class list box displays a document class, inquired to the document management server 3, in a selectable manner. For example, a file storing document classes is stored in the storage unit 130, and the control unit 110 displays a document class, acquired from the file, in a selectable manner.

The user manipulates the input unit 140 to select the most preferable client name, creator and document class from the respective expanded list boxes.

With regard to a document name, although the content which is automatically acquired in the "acquisition of document attribute" process is displayed in a text box, the user can directly input a document name by manipulating the input unit 140. On the other hand, with regard to the document content, since it cannot be automatically acquired in the "acquisition of document attribute" process, the user inputs necessary information in the text box.

When the user performs double clicking or so on a file name, the control unit 110 newly displays screen information (not shown) for changing the file name on the output unit 150. To change the file name, the user manipulates the screen to input a new file name.

A deletion check box written as "Delmark" at the upper left end in the list screen is to delete a file displayed in the same row. When there is a file to be deleted, the user checks the deletion box.

Further, a hyperlink is set to a file path. That is, when the user selects a file path with a mouse or the like, a file indicated by the selected file path is opened in an application software corresponding to the selected file path. When a document file of the type that corresponds to predetermined spreadsheet software is selected, for example, the predetermined spreadsheet software, if not running, is initiated and the selected file is opened therein. As a result, the contents of the file can be confirmed. Achievement of the hyperlink capability requires that application software which opens a file should be installed in the document transfer assisting apparatus 1.

When the user edits each attribute information as needed through various methods mentioned above, and presses a Reflect Change button on the document list screen, the edited content is set (step S202). When the changed attribute information is a file name, the control unit 110 sends a request to change the file name to the operating system to change the file name (step S203). The file whose deletion check box is checked, the control unit 110 sends a deletion request to the operating system to delete the file (step S204).

Next, the control unit 110 reflects the changed attribute information in the document attribute storage unit 131 (step S205). That is, for each file whose attribute information has been changed, the control unit designates the document ID of the file and the attribute item field which has been changed to update the contents of the document attribute storage unit 131 with new attribute information. With regard to a file whose deletion check box is checked, the control unit 110 deletes a record corresponding to the file from the document attribute storage unit 131.

Finally, latest information is acquired from the document attribute storage unit 131 to display the information on the list screen the latest one (step S206).

The control unit 110 may be configured in such a way that when the user designates each attribute item field on the document list screen by clicking, the control unit 110 sorts the records of document attribute information based on the designated attribute item field. When any one of a file name, client name and creator is designated, for example, the contents of the designated item are sorted in the alphabetical order. When date attribute field is designated, the contents of the date attribute field are sorted according to the dates.

When records are sorted based on the file name and as a result, plurality of files having the same file name are displayed, a file name can be changed after the contents of files are checked using the hyperlink function of the file path, or one of two files which are identical can be deleted, thus ensuring organization of files.

When a file ID is double-clicked, the control unit 110 may display an attribute information input screen as shown in FIG. 8B to view and edit the attribute of a file specified by the file ID. Although attribute items editable on the document attribute input screen are the same as those of the list screen, detailed items, such as the file size, update date, date of creation and last referred date, may be displayed.

As the user manipulates the list screen to edit attribute information automatically acquired in the "acquisition of document attribute" process in the above-described manner, it is possible to reduce the user's work of inputting information thus allowing efficient input of necessary information.

(Organization of Managed Files)

Figure 9:
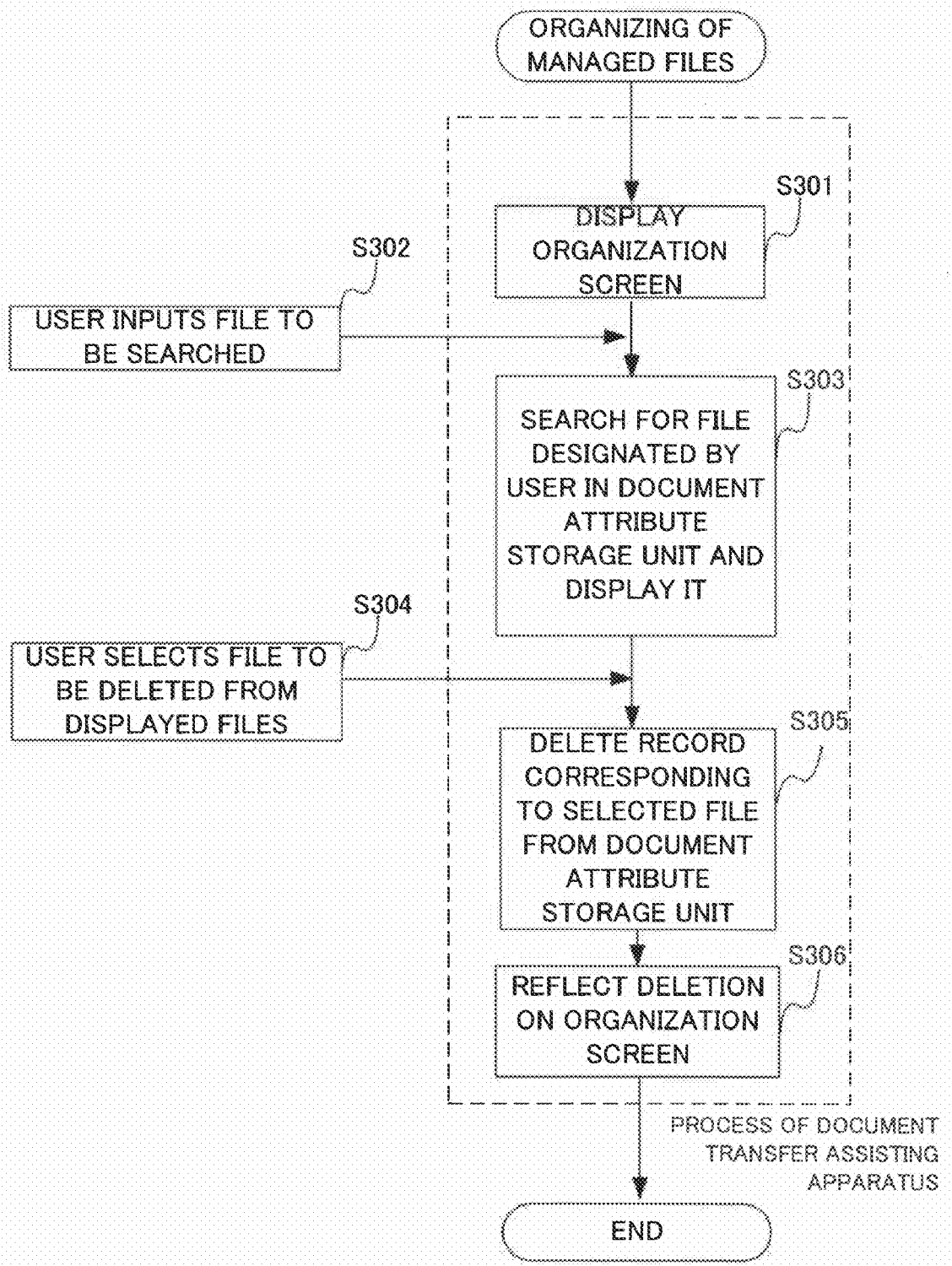
FIG. 9 is a flowchart for explaining an "organizing of managed files" process.

A process for "organization of managed files" will be described referring to FIG. 9. When the user presses an "Organization of Managed Files" button on the menu screen shown in FIG. 4 which is displayed on the document transfer assisting apparatus 1, the control unit 110 displays an organization screen shown in FIG. 10 (step S301). On the organization screen for managed files, files whose attributes have been acquired in the "acquisition of document attribute" process by the document transfer assisting apparatus 1 are organized. That is, the user manipulates the organization screen to delete, from the document attribute storage unit 131, those of the files whose attributes have been acquired which are no longer desired to be registered in the document management server 3 or those files whose entities have been deleted from the file path.

The control unit 110 of the document transfer assisting apparatus 1 acquires file path information stored in the document attribute storage unit 131 and regularly determines whether the entity of a file exists in the file path. When a request to open a file designated by a file path is made to the organization screen and a value indicative of a failure is received as a return value, for example, it may be determined that the entity of the file does not exist. A file whose entity is determined to have been deleted may be emphasized and displayed by coloring the portion of the file path before deletion of the file in red or by flickering the portion on the list screen shown in FIG. 8A or on the organization screen shown in FIG. 10.

Figure 10:
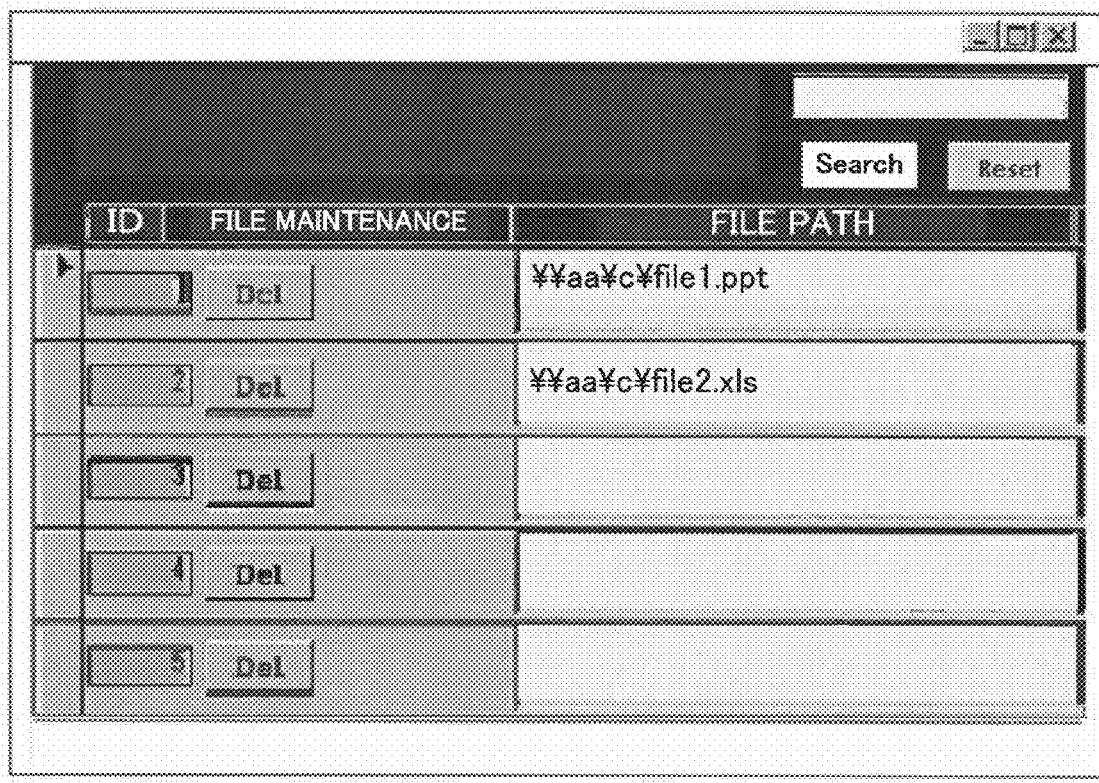
FIG. 10 is a diagram showing a display example of an organization screen.

Referring to files displayed that do not reflect the correct information of the current state of the file, the user manipulates the organization screen in FIG. 10 to input a file to be searched from the document attribute storage unit 131 into a search box (shown in the top right corner), and presses a Search button (step S302). The control unit 110 of the document transfer assisting apparatus 1 searches the document attribute storage unit 131 to display file information, which matches with the file name input by the user, on the organization screen (step S303). As the user presses a Del button corresponding to the file to be deleted from the document attribute storage unit 131 (step S304), the control unit 110 deletes a record corresponding to the file from the document attribute storage unit 131 (step S305). Then, the control unit 110 displays the organization screen on which the deletion is reflected (step S306), and then terminates the process.

(Registration to Document Management Server)

Figure 11A:
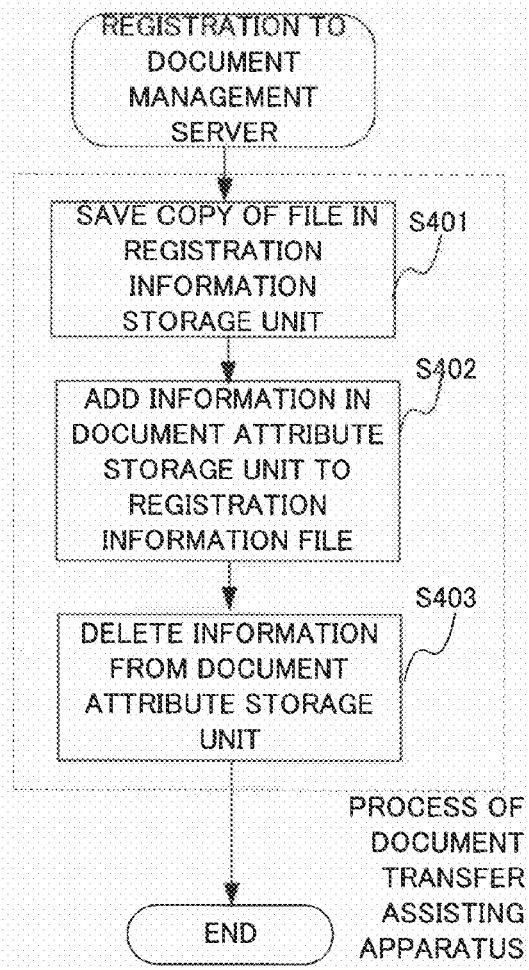
FIG. 11A is a flowchart for explaining the operation of a document transfer assisting apparatus in a "registration to document management server" process.
Figure 11B:
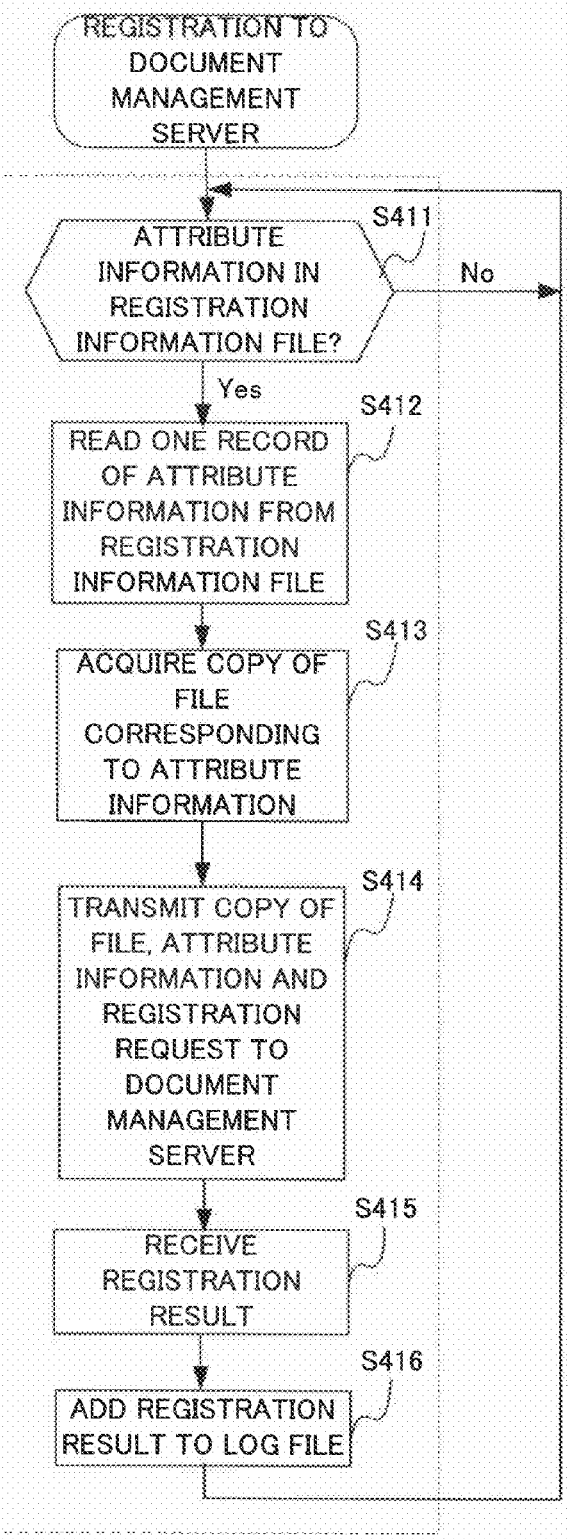
FIG. 11B is a flowchart for explaining the operation of a monitor apparatus in the "registration to document management server" process.

A process for "registration to document management server" or a process for registering a document in the document management server 3 based on the contents of the document attribute storage unit 131 will be described referring to FIGS. 11A and 11B. FIG. 11A illustrates the process of the document transfer assisting apparatus 1, and FIG. 11B illustrates the process of the monitor apparatus 2.

When the user selects "registration to document management server" from the menu screen shown in FIG. 4, the control unit 110 of the document transfer assisting apparatus 1 acquires file path information of each record in the document attribute storage unit 131 and stores a copy of an entity file specified by the file path in the registration information storage unit 231 (step S401).

To prevent files with the same file name in different folders from being overwritten with each other, a file path name whose delimiter (e.g., symbol "¥") for a directory (folder) is replaced with an under bar (e.g., a file path c:¥aa¥file.doc is changed to c_aa_file.doc), for example, is registered as a new file name.

Next, the control unit 110 converts attribute information registered in the document attribute storage unit 131 to CSV format, and adds the converted attribute information to a registration information file stored in the registration information storage unit 231 (step S402). At this time, in consideration of a case where there are plurality of document transfer assisting apparatuses 1, the document transfer assisting apparatus 1 that has added the record (row) in the registration information file should be made distinguishable. For example, the control unit 110 stores ID information of the document transfer assisting apparatus 1 which has added a record in association with that record. Then, the attribute information added to the registration information file is deleted from the document attribute storage unit 131 (step S403). This completes the process of the document transfer assisting apparatus 1.

The arrangement of the attribute item fields in the registration information file can be changed in a way that the document management server 3 accepts the request as a registration request by executing the "editing of document attribute" to be described later. As a result, the attribute item fields and the arrangement order thereof are stored in the control information storage unit 132 in association with each other. Based on the arrangement order stored in the control information storage unit 132, the control unit 110 reads attribute information for each of all the records to be stored in the document attribute storage unit 131 therefrom, and outputs information of one record as a row to the registration information file.

Next, the process of the monitor apparatus 2 in the "registration to document management server" process will be described referring to FIG. 11B. The control unit 210 of the monitor apparatus 2 regularly monitors the registration information file to be stored in the registration information storage unit 231. When attribute information is stored in the registration information file (step S411; Yes), the control unit 210 reads attribute information one record (one row) at a time (step S412). Then, the control unit 210 performs processes of steps S413 to S416 to be described below for each record read.

That is, the control unit 210 acquires a file path name from the record, and reads a file from the registration information storage unit 231 (step S413) having a file path name whose delimiter is replaced with an under bar file, that matches the acquired file path name. Then, the control unit 210 transmits attribute information to be stored in the record (file name, file size, date of creation, update date, last referred date, file type, file path, client name, creator, document class, document name, document content, etc.), the file read in step S413, and a registration request to the document management server 3 (step S414). At this time, the control unit 210 designates a folder in the document management server 3 which has the same name as the document class name as a location where the document is to be registered.

The control unit deletes from the registration information storage unit 231 and the registration information file, the copied document and their attribute information, which have been transmitted together with the registration request to the document management server 3. Therefore, only those documents whose registration requests have not been transmitted yet and their attribute information are stored in the registration information storage unit 231 and the registration information file, respectively.

The monitor apparatus 2 receives, from the document management server 3, registration result information indicating the results of executing the process of registering a document (step S415). The registration result information includes information, such as a file name, execution date, and registration result (failure or success).

As mentioned above, each record of the registration information file stores ID information indicating the document transfer assisting apparatus 1 that has outputted information on the record in association with a file path. When a registration request is transmitted in step S414, therefore, the control unit 210 temporarily stores the file path and ID information in the RAM or the like. Then, upon reception of the registration result information in step S415, the control unit 210 transforms the received registration result information and the information temporarily stored in the RAM into the CSV format as shown in FIG. 3, and adds the result to a predetermined log file stored in the registration result storage unit 232 (step S416). As shown in FIG. 3, a file path is stored as a source file path, and ID information is stored as sender ID information. Storing the sender ID information allows to distinguish which registration result information corresponds to a registration request from which document transfer assisting apparatus 1.

(Display of Registration Results)

A process for "display of registration results" will be described referring to FIG. 12. When the user selects "Registration Result" on the menu screen shown in FIG. 4, the control unit 110 of the document transfer assisting apparatus 1 displays a registration result screen shown in FIG. 13 (step S501). When the user presses an "Acquire Log" button at the upper portion of the registration result screen (step S502), the control unit 110 of the document transfer assisting apparatus 1 refers to a log file having registration result information added thereto in step S416 to extract registration result information in which ID information (requester ID information) identifying itself is stored. Then, the control unit 110 adds and displays the extracted registration result information to the screen in FIG. 13 (step S503).

(Various Settings)

As the user presses a button in the "Various Settings" group on the menu screen in FIG. 4, various setting (configuration) information can be changed.

Figure 14:
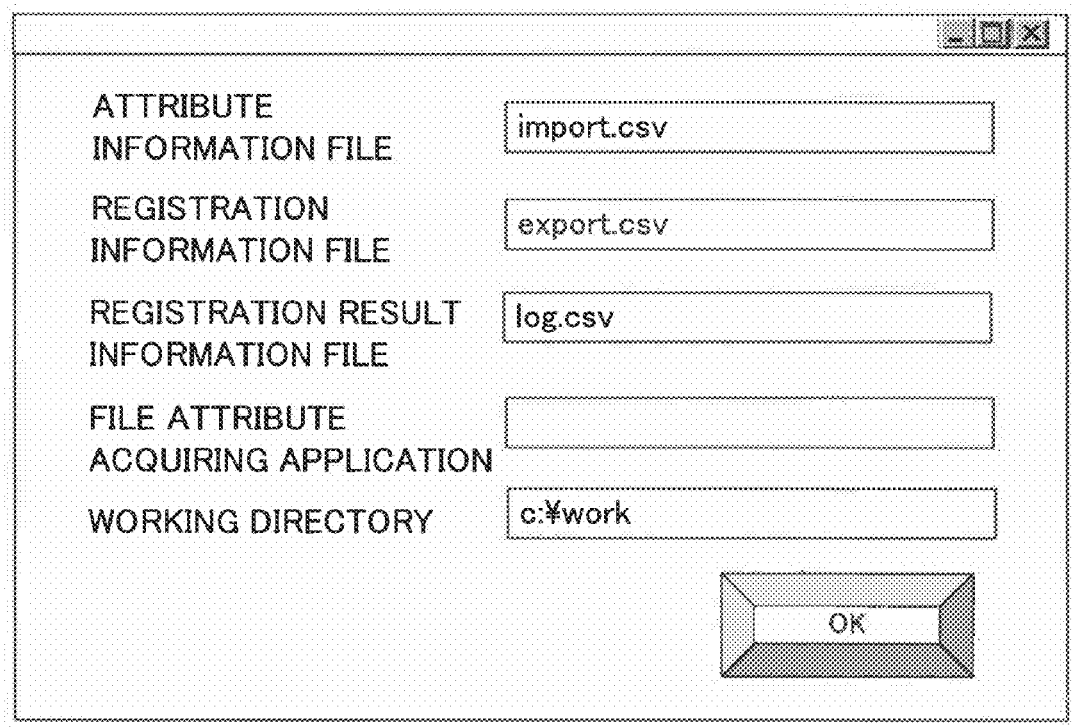
FIG. 14 is a diagram showing a display example of a control information setting screen.

When "Setting of Control Information" is selected, a control information setting screen shown in FIG. 14 is displayed on the document transfer assisting apparatus 1. The user can designate an attribute information file, a registration information file and a registration result information file, and can designate a folder (equivalent to "work directory" in FIG. 14) serving as the registration information storage unit 231.

When information as shown in FIG. 14 is set on the control information setting screen, for example, the document transfer assisting apparatus 1 refers to import.csv as an attribute information file, and log.csv as a registration result information file, and outputs data in the document attribute storage unit 131 to export.csv as a registration information file. On the other hand, because information is not set in a file attribute acquiring application, the file attribute acquiring function provided by the document transfer assisting apparatus 1 is used. If the file attribute acquiring application designated, the designated application is initiated upon performance of attribute acquiring process. c:¥work is set in the field of the work directory. Therefore, c:¥work functions as the registration information storage unit 231, storing a registration information file (export.csv) and copies of files to be registered in the document management server 3 are saved under c:¥work.

When the user sets information in the control information setting screen and presses an "OK" button, the control unit 110 stores the configuration field and configuration information thereof in the control information storage unit 132 in association with each other.

When the user presses an "Editing of Document Attribute" button in the menu screen in FIG. 4, an attribute item edit screen (not shown) for addition, deletion and editing of attribute items (fields) which are managed by the document attribute storage unit 131 is displayed on the document transfer assisting apparatus 1. The control unit 110 of the document transfer assisting apparatus 1 updates attribute item fields managed by the document attribute storage unit 131 of the document transfer assisting apparatus 1 according to an instruction input by the user. Accordingly, the list screen (FIG. 8A) or the document attribute input screen (FIG. 8B) is displayed. A document attribute item field may be designed to be changeable. For example, the structures of the list screen and the document attribute input screen may be designed to be editable, so that an attribute item to be displayed can be selected from attribute items which are managed by the document attribute storage unit 131. This allows the document transfer assisting apparatus 1 to flexibly handle the attribute items which are managed by the document management server 3.

As mentioned above, the control unit 110 converts an attribute item managed by the document attribute storage unit 131 to the CSV format, and outputs the converted attribute item to the registration information file. At this time, the arrangement of attribute items managed by the document attribute storage unit 131 can be set on the attribute item edit screen. When the user manipulates the attribute item edit screen to input an instruction, the control unit stores the attribute item in association with the arrangement order thereof in the control information storage unit 132 in response to the input instruction. This can allow the arrangement of attribute information of the registration information file to be flexibly changed in the form the document management server 3 accepts as a registration request.

According to the embodiment, as described above, the document transfer assisting apparatus 1 and the monitor apparatus 2 mediate between the document management server 3 and a file server or a terminal device to which a designated document in the document management server 3 is registered. The user can collectively register documents in the document management server 3 without being aware neither of the folder structure of the document management server 3 or the attribute item managed by the document attribute storage unit 131. Because the exchange of information with the document management server 3 is carried out using a CSV file having high versatility, it enables the monitor apparatus to deal with various kinds of document management servers.

Although the embodiment of the present invention has been explained above, it is not restrictive and various modifications and applications can be made in working out the invention.

For example, while the "registration to document management server" process is designed to start when the "Register to Document Management Server" button is pressed on the menu screen shown in FIG. 4, this process may be initiated at a predetermined time interval or at a predetermined designated time when attribute information is stored in the document attribute storage unit.

In the embodiment, a copy of a document to be registered is stored in the registration information storage unit. Instead, only the attribute information of a document to be registered may be stored in the registration information storage unit. In this case, based on a file path included in the attribute information to be stored in the registration information file, the monitor apparatus may acquire a file specified by the file path and register the acquired file in the document management server.

While CSV files which have a high versatility are used for an attribute information file, a registration information file, a log file and so forth, a spreadsheet data type or other data types may be used instead. Alternatively, the aforementioned files may be stored in a database. In this case, application software for referring to the data type used for the attribute information file, registration information file, and log file, or the database type should be installed on the referring side.

Although the foregoing embodiment is configured to have one monitor apparatus 2 present for one document management server, a plurality of monitor apparatuses 2 may be provided for a single document management server. In this case, the registration information file and the registration information storage unit to which each individual monitor apparatus 2 refers should be set so as to differ from the registration information file and registration information storage unit to which another individual monitor apparatus 2 refers.

Although the document transfer assisting apparatus 1, the monitor apparatus 2 and the document management server 3 are configured as different apparatuses in the embodiment, all the functions of the three apparatuses may be realized as a single apparatus, or some of the functions may be implemented on a single apparatus while the other functions may be implemented on another apparatus.

The foregoing description of the embodiment has been given using the example where the control program for the document transfer assisting apparatus 1 is stored in a storage unit or the like beforehand. However, the document transfer assisting apparatus 1 or the monitor apparatus 2 may be equipped with any adequate one of storage mediums, such as a flexible disk, CD-ROM (Compact Disk Read-Only Memory), DVD (Digital Versatile Disk), and MO (Magneto- Optical disk), so that the control program is stored in such a storage medium to be loaded into the document transfer assisting apparatus 1 or the monitor apparatus 2 to achieve an apparatus which executes the above-described operations.

The control program may be stored in a disk device or the like equipped in a predetermined server unit on the communication network, and downloaded into the document transfer assisting apparatus 1 as needed. Further, the above-described processes can be accomplished by executing the program transferred over the communication network.

It is to be noted that the control unit of the document transfer assisting apparatus 1 according to the embodiment may be configured to be realized by exclusive hardware, not a program-controllable type.

As described above, the present invention provides a document transfer assisting system, monitor apparatus, document transfer assisting apparatus, method and computer readable recording medium which efficiently give metadata to a document to assist transfer of the document to a document management server.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-300780 filed on Nov. 20, 2007 and including specification, claims, drawings and summary. The disclosure of the above Japanese Patent Application is incorporated herein by reference in its entirety,

What is claimed is:

1. A document transfer assisting system having a document transfer assisting apparatus connected over a network to a monitor apparatus that monitors a predetermined file to which the document transfer assisting apparatus outputs information in CSV (Comma-Separated Values) file format, and requests a predetermined document management server to register a document based on the information output to the predetermined file, the monitor apparatus comprising:

a registration information storage unit that stores a predetermined file having, as a record in CSV file format, attribute information outputted by the document transfer assisting system including, as a field, information on a document to be registered in the document management server in response to an instruction input to the document transfer assisting apparatus by a user, the information specifying at least the document; and a registration information monitoring unit that monitors the predetermined file stored in the registration information storage unit, and, when determining that attribute information is output to the predetermined file, acquires a document based on document specifying information included in each of the attribute information outputted, and transmits the document, the attribute information thereof, and a document registration request to the document management server, the document transfer assisting apparatus comprising:

a document attribute acquiring unit that, for each document to be registered in the document management server designated by the user, acquires attribute information including information specifying at least the document;

a document attribute storage unit that stores the acquired attribute information;

an update unit that updates the attribute information stored in the document attribute storage unit in response to an instruction input by the user;

an edit unit that adds, edits, and deletes a field of the attribute information stored in the document attribute storage unit in response to an instruction input by the user; and a registration unit that outputs, as a record in CSV file format, each piece of the attribute information stored in the document attribute storage unit to the predetermined file stored in the registration information storage unit of the monitor apparatus at a predetermined timing.

2. The document transfer assisting system according to claim 1, wherein in the document transfer assisting apparatus, the registration unit names, according to a predetermined rule, a copy file of a document to be registered in the document management server specified by the information stored in the document attribute storage unit, outputs the copy file and the name of the copy file in the registration information storage unit, the name of the copy file being the information specifying at least the document stored in the predetermined file of the registration information storage unit, and in the monitor apparatus, when determining that attribute information is output to the predetermined file, the registration information monitoring unit acquires a copy file having a file name included in each of the attribute information outputted, and transmits the copy file, the attribute information thereof, and a document registration request to the document management server.

3. The document transfer assisting system according to claim 1, wherein in the document transfer assisting apparatus, the registration unit outputs to the predetermined file of the registration information storage unit, a file path indicating a location of the document to be registered in the document management server specified by the information stored in the document attribute storage unit, the file path being the information specifying at least the document stored in the predetermined file of the registration information storage unit, and in the monitor apparatus, when determining that attribute information is output to the predetermined file, the registration information monitoring unit acquires a document specified by the file path included in each of the attribute information outputted, and transmits the document, the attribute information thereof, and a document registration request to the document management server.

4. The document transfer assisting system according to claim 1, wherein the monitor apparatus further comprises:

a reception unit that receives from the document management server, registration result information for each of requests, transmitted by the registration unit, and a registration result storage unit that stores the received registration result information, and the document transfer assisting apparatus further comprises a registration result acquiring unit that acquires the registration result information stored in the registration result storage unit.

5. The document transfer assisting system according to claim 1, wherein in the document transfer assisting apparatus, the registration unit outputs, as a record in CSV file format, each piece of the attribute information stored in the document attribute storage unit to the predetermined file stored in the registration information storage unit at least at any one of the following timings of: when an instruction from the user has been input, at a predetermined time, and at a predetermined time interval.

6. A monitor apparatus connected over a network to a document transfer assisting apparatus to monitor a predetermined file to which the document transfer assisting apparatus outputs information in CSV (Comma-Separated Values) file format, and request a predetermined document management server to register a document based on the information output to the predetermined file, the monitor apparatus comprising:
- a registration information storage unit that stores a predetermined file having, as a record in CSV file format, attribute information outputted by the document transfer assisting system including, as a field, information on a document to be registered in the document management server in response to an instruction input to the document transfer assisting apparatus by a user, the information specifying at least the document; and
- a registration information monitoring unit that monitors the predetermined file stored in the registration information storage unit, and, when determining that attribute information is output to the predetermined file, acquires a document based on document specifying information included in each of the attribute information outputted, and transmits the document, the attribute information thereof, and a document registration request to the document management server.

7. A document transfer assisting apparatus connected over a network to a monitor apparatus that monitors a predetermined file and requests a predetermined document management server to register a document based on information output in CSV (Comma-Separated Values) file format to the predetermined file, the document transfer assisting apparatus comprising:
- a document attribute acquiring unit that, for each document to be registered in the document management server designated by the user, acquires attribute information including information specifying at least the document;
- a document attribute storage unit that stores the acquired attribute information;
- an update unit that updates the attribute information stored in the document attribute storage unit in response to an instruction input by the user;
- an edit unit that adds, edits, and deletes a field of the attribute information stored in the document attribute storage unit in response to an instruction input by the user; and
- a registration unit that outputs, as a record in CSV file format, each piece of the attribute information stored in the document attribute storage unit to the predetermined file monitored by the monitor apparatus at a predetermined timing.

8. An operation method for a document transfer assisting system having a document transfer assisting apparatus connected over a network to a monitor apparatus that monitors a predetermined file to which the document transfer assisting apparatus outputs information in CSV (Comma-Separated Values) file format, and requests a predetermined document management server to register a document based on the information output to the predetermined file, the monitor apparatus including a registration information storage unit and a registration information monitoring unit, the document transfer assisting apparatus including a document attribute acquiring unit, a document attribute storage unit, an update unit, an edit unit, and a registration unit, the operation method including the steps of:

in the monitor apparatus,
allowing the registration information storage unit to store a predetermined file having, as a record in CSV file format, attribute information outputted by the document transfer assisting system including, as a field, information on a document to be registered in the document management server in response to an instruction input to the document transfer assisting apparatus by a user, the information specifying at least the document; and allowing the registration information monitoring unit to monitor the predetermined file to be stored in the registration information storage unit, and, when determining that attribute information is output to the predetermined file, to acquire a document based on document specifying information included in each of the attribute information outputted, and to transmit the document, the attribute information thereof, and a document registration request to the document management server, in the document transfer assisting apparatus,
allowing the document attribute acquiring unit to, for each document to be registered in the document management server designated by the user, acquire attribute information including information specifying at least the document;

allowing the document attribute storage unit to store the acquired attribute information;

allowing the update unit to update the attribute information stored in the document attribute storage unit in response to an instruction input by the user;

allowing the edit unit to add, edit, and delete a field of the attribute information stored in the document attribute storage unit in response to an instruction input by the user; and allowing the registration unit to output, as a record in CSV file format, each piece of the attribute information stored in the document attribute storage unit to the predetermined file stored in the registration information storage unit at a predetermined timing.

9. A non-transitory computer readable recording medium storing a program for allowing a document transfer assisting apparatus computer to function as a document transfer assisting apparatus, and a program for allowing a monitor apparatus computer, connected over a network to the document transfer assisting apparatus computer, to function as a monitor apparatus that monitors a predetermined file to which the document transfer assisting apparatus outputs information in CSV (Comma-Separated Values) file format, and requests a predetermined document management server to register a document based on the information output to the predetermined file, the program for the monitor apparatus allowing the monitor apparatus computer to function as:
- a registration information storage unit that stores a predetermined file having, as a record in CSV file format, attribute information outputted by the document transfer assisting system including, as a field, information on a document to be registered in the document management server in response to an instruction input to the document transfer assisting apparatus by a user, the information specifying at least the document; and
- a registration information monitoring unit that monitors the predetermined file stored in the registration information storage unit, and, when determining that attribute information is output to the predetermined file, acquires a document based on document specifying information included in each of the attribute information outputted, and transmits the document, the attribute information thereof, and a document registration request to the document management server, the program for the document transfer assisting apparatus allowing the document transfer assisting apparatus computer to function as:
a document attribute acquiring unit that, for each document to be registered in the document management server designated by the user, acquires attribute information including information specifying at least the document;
a document attribute storage unit that stores the acquired attribute information;
an update unit that updates the attribute information stored in the document attribute storage unit in response to an instruction input by the user;
an edit unit that adds, edits, and deletes a field of the attribute information stored in the document attribute storage unit in response to an instruction input by the user; and
a registration unit that outputs, as a record in CSV file format, each piece of the attribute information stored in the document attribute storage unit to the predetermined file stored in the registration information storage unit of the monitor apparatus at a predetermined timing.

* * * * *